(12) United States Patent
Di Lullo et al.

(10) Patent No.: US 7,581,513 B2
(45) Date of Patent: *Sep. 1, 2009

(54) ANIMAL EYEWEAR

(75) Inventors: Veronica Di Lullo, Los Gatos, CA (US);
Kenneth Di Lullo, Los Gatos, CA (US)

(73) Assignee: Midknight Creations, LLC, Los Gatos, CA (US)

( * ) Notice: Subject to any disclaimer, the term of this patent is extended or adjusted under 35 U.S.C. 154(b) by 524 days.

This patent is subject to a terminal disclaimer.

(21) Appl. No.: 11/076,318

(22) Filed: Mar. 8, 2005

(65) Prior Publication Data

US 2005/0151924 A1   Jul. 14, 2005

Related U.S. Application Data

(63) Continuation of application No. 10/351,000, filed on Jan. 23, 2003, now Pat. No. 6,863,032.

(51) Int. Cl.
*A01K 29/00* (2006.01)

(52) U.S. Cl. .......................... 119/850; 2/426

(58) Field of Classification Search ............. 119/836, 119/850, 856; 54/80.2; 2/426, 445, 452, 2/15, 435, 436; 351/41, 157, 62, 47, 124, 351/133, 142; D16/303, 311
See application file for complete search history.

(56) References Cited

U.S. PATENT DOCUMENTS

| | | | | |
|---|---|---|---|---|
| 903,108 | A * | 11/1908 | Rogers | 119/850 |
| 2,407,029 | A | 9/1946 | Miller | |
| 2,427,918 | A * | 9/1947 | Malcom et al. | 2/441 |
| 3,229,303 | A * | 1/1966 | Severin | 2/443 |
| 3,924,388 | A * | 12/1975 | Morrison | 54/80.1 |
| 4,178,742 | A * | 12/1979 | Longfellow | 54/80.2 |
| 4,756,145 | A | 7/1988 | Pelling | |
| 5,069,541 | A * | 12/1991 | Holmes et al. | 351/86 |
| 5,093,940 | A * | 3/1992 | Nishiyama | 2/441 |
| 5,406,340 | A * | 4/1995 | Hoff | 351/156 |
| 5,410,763 | A * | 5/1995 | Bolle | 2/436 |
| 5,428,410 | A * | 6/1995 | Lei | 351/47 |
| 5,488,441 | A * | 1/1996 | Pomatti | 351/156 |
| 5,706,526 | A * | 1/1998 | Huang | 2/428 |
| 5,711,036 | A * | 1/1998 | Kita et al. | 2/452 |
| 5,732,415 | A * | 3/1998 | Boyd | 2/426 |
| 5,799,338 | A * | 9/1998 | Huang | 2/428 |
| 5,841,505 | A * | 11/1998 | Bollé | 351/44 |
| 5,867,841 | A * | 2/1999 | Chiang | 2/436 |
| 5,868,104 | A * | 2/1999 | Ramirez | 119/850 |
| 5,894,606 | A | 4/1999 | Chiang | |
| 5,896,589 | A * | 4/1999 | Chou | 2/428 |
| 5,926,855 | A * | 7/1999 | Brodbeck | 2/426 |
| 5,956,115 | A * | 9/1999 | Bolle | 351/62 |

(Continued)

OTHER PUBLICATIONS http://web.archive.org/web/20000510212102/http://www.doggles.com/.*

(Continued)

*Primary Examiner*—Yvonne R. Abbott
(74) *Attorney, Agent, or Firm*—Hickman Palermo Truong & Becker LLP

(57) ABSTRACT

Animal eyewear, including protective sun goggles, is dimensionally optimized for canines. Other embodiments provide interchangeable lenses and other features.

17 Claims, 7 Drawing Sheets

U.S. PATENT DOCUMENTS

| | | | | |
|---|---|---|---|---|
| 6,032,298 | A * | 3/2000 | Chiang | 2/428 |
| 6,047,410 | A * | 4/2000 | Dondero | 2/426 |
| 6,092,243 | A * | 7/2000 | Wu et al. | 2/441 |
| 6,098,206 | A * | 8/2000 | Chou | 2/428 |
| 6,253,388 | B1 | 7/2001 | Lando | |
| 6,311,645 | B1 * | 11/2001 | Brown | 119/712 |
| 6,350,030 | B2 | 2/2002 | Fujima | |
| D457,546 | S | 5/2002 | Chiang | |
| 6,449,777 | B1 * | 9/2002 | Montague | 2/452 |
| 6,467,098 | B1 * | 10/2002 | Lee | 2/443 |
| D466,543 | S | 12/2002 | Beames | |
| 6,588,899 | B2 * | 7/2003 | Pierotti | 351/159 |
| 6,637,877 | B1 * | 10/2003 | Hartley et al. | 351/44 |
| D498,026 | S * | 11/2004 | Di Lullo et al. | D30/199 |
| 6,863,032 | B2 * | 3/2005 | Di Lullo et al. | 119/850 |
| 6,871,952 | B2 * | 3/2005 | Pierotti | 351/159 |
| 6,926,403 | B2 * | 8/2005 | Yi et al. | 351/62 |

OTHER PUBLICATIONS

MidKnight Creations' product, entitled "Ski Dogs" Doggles, which was posted on website "doggles.com" in 1996. (1 pg.).

MidKnight Creations' product, entitled "Red Barons" Doggles, which was posted on website "doggles.com" in 1996. (1 pg.).

MidKnight Creations' product, entitled "Froggers" Doggles, which was posted on website "doggles.com" in 1996. (1 pg.).

* cited by examiner

ANIMAL EYEWEAR

CROSS-REFERENCE TO RELATED APPLICATIONS; PRIORITY CLAIM

This application claims domestic priority under 35 U.S.C. §120 as a continuation of application Ser. No. 10/351,000, filed Jan. 23, 2003, now U.S. Pat. No. 6,863,032, the entire contents of which is hereby incorporated by reference as if fully set forth herein.

FIELD OF THE INVENTION

The present invention generally relates to protective articles for animals. The invention relates more specifically to animal eyewear.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Sunglasses and other eyewear that block ultraviolet (UV) rays are commonly used by people. Research has shown that long hours in the sun without adequate eye protection increase the chances of developing eye disease. However, in the past protective eyewear has not been available for animals, especially domestic animals and house pets such as dogs and cats. Thus, there is a need for UV-absorbent sunglasses or other eyewear to help protect the eyes of pets from sun damage.

The American National Standards Institute (ANSI) has set standards for type A UV radiation (UVA) and type B UV radiation (UVB) protection in eyewear. In particular, ANSI requires that a pair of sun goggles block at least 50 percent of UV rays. While these standards were developed for human eyewear, it is believed that equivalent safety standards are appropriate for animal use. Thus, there is a need for animal eyewear that conforms to these standards.

The eye disease chronic superficial keratitis or "pannus" is increasingly common in dogs. While drug therapy is normally recommended for pannus, veterinarians also have suggested that dogs with pannus should stay out of direct sun and get protection from UV light. However, not all dog owners are able to observe these restrictions with their pets without assistance. Thus, there is a need for a form of eyewear for canines that provides protection for those with pannus.

Still other animals are subjected to wind and airborne debris. For example, some dog owners transport their animals in a motorcycle sidecar, in vehicles with open windows, or in the back of a pickup truck, or in other locations that expose the dog to wind during movement. As another example, animals that assist humans in search and rescue activities often are exposed to airborne debris.

While some dog owners use ordinary sunglasses for their dogs, such glasses do not adequately protect the animal from wind and debris because they typically have open sides or a loose fit. In another approach, unmodified goggles intended for humans are used on animals. However, there are significant anatomical differences in the structure of the canine skull as compared to the human skull. For example, human goggles do not properly fit the canine head because the nose bridge is typically too small and otherwise proportioned incorrectly. Further, in canines the distance between the eyes, the orientation of the eye sockets, and the width and height of the eyes are far different from their human counterparts so that the lenses and eye cups of human goggles do not fit properly. Still another problem is that different dog breeds are characterized by great differences in the foregoing dimensions; the skull proportions of a small breed such as a Chihuahua are far different from those of a Great Dane. As a result, use of human goggles is troublesome, and the use of a single size of human goggles for all canines is impractical.

Thus, there is a need for a way to protect dogs and other animals with eye protection against wind and debris.

More generally, there is a clear need for a way to protect the eyes of animals from trauma, reduce glare, and relieve light sensitivity.

BRIEF DESCRIPTION OF DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

I. Animal Eyewear with Dual Strap Configurations

Figure 1:
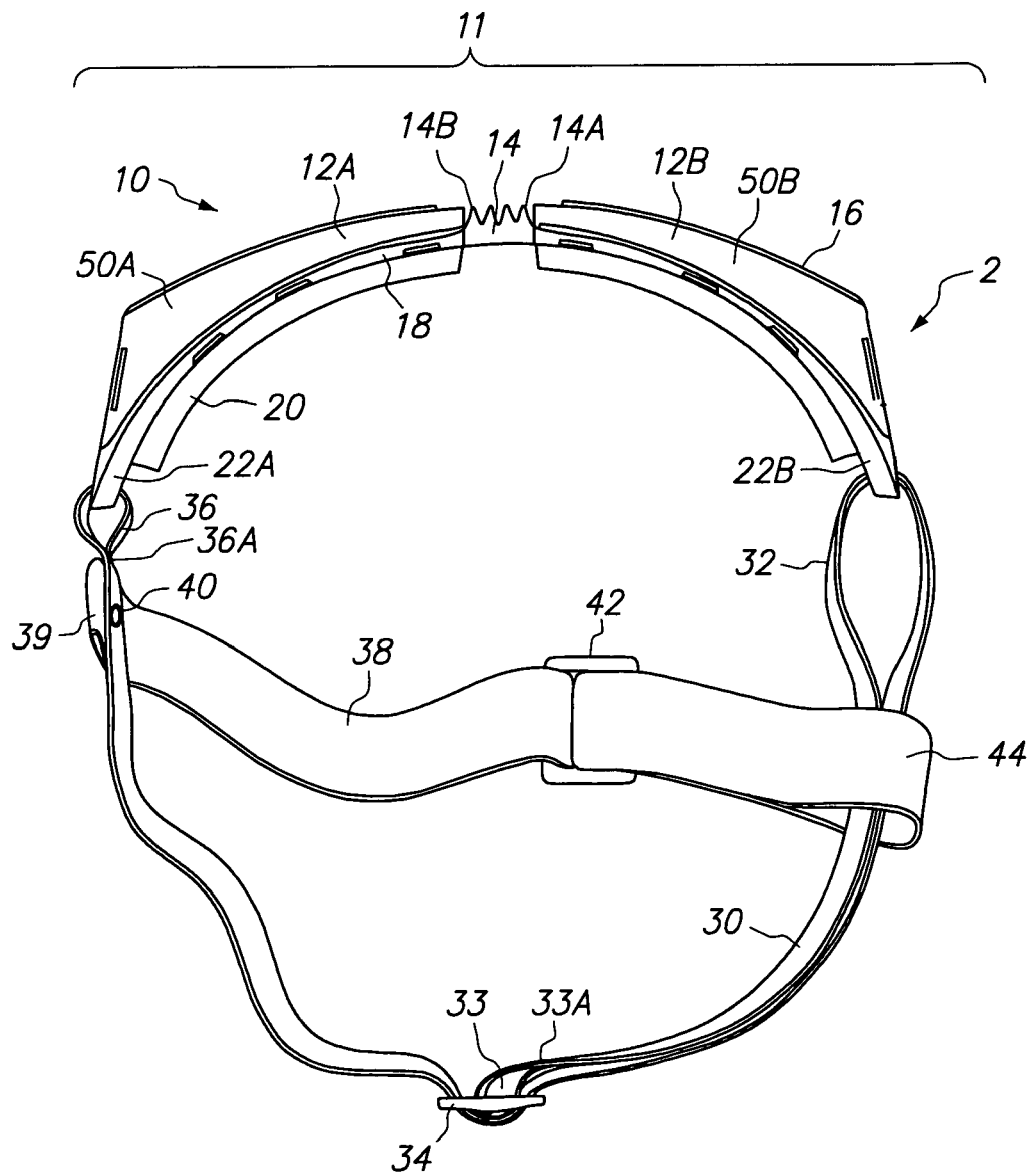
FIG. 1 is a top plan view of animal eyewear.

FIG. 1 is a top plan view of animal eyewear according to one embodiment. Eyewear 2 comprises a frame 10 having an integrally formed first eyepiece 12a and second eyepiece 12b joined by a flexible bridge 14. Frame 10 is generally formed in an inwardly curving configuration to facilitate close contact of eyepieces 12a, 12b with the eye orbits of an animal when the eyewear is worn. In this configuration, frame 10 has a wraparound configuration that prevents wind, debris, and light from entering the sides of eyepieces 12a, 12b and reaching the eyes of the animal.

The bridge 14 may be configured to enable the first and second eyepieces 12a, 12b to flex with respect to one another. For example, if eyewear 2 is fitted to an animal with a relatively small head, then action of straps 30, 38 (described further below) will urge eyepieces 12a, 12b rearward and against the head of the animal. Alternatively, if the animal has a relatively large head, then bridge 14 can flex outward so that eyepieces 12a, 12b also move outwardly and separate. In the embodiment of FIG. 1, bridge 14 has a plurality of teeth 14a and corresponding serrations 14b; however, these elements are arbitrary and ornamental and do not serve a particular function. Alternatively, bridge 14 is flat and non-ornamented.

Figure 2:
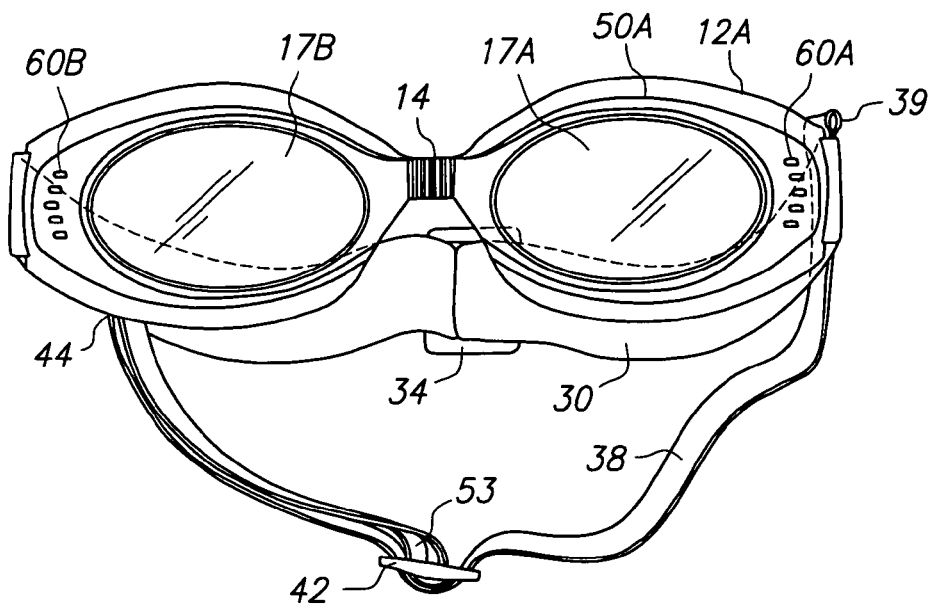
FIG. 2 is a front elevation view of the animal eyewear of FIG. 1.

Each eyepiece 14a, 14b comprises a lens cup 16 that surrounds and provides a mount for lenses 17a, 17b, best seen in FIG. 2, and a rear peripheral ridge 18 to which a strip of resilient material 20 is mounted. Resilient material 20 may be affixed to ridge 18 using an adhesive.

A first strap 30 and second strap 38 are attached to frame 10 to facilitate holding the frame in position on the head of an animal. First strap 30 serves as a head strap and is joined to the pair of eyepieces and configured for retaining the eyepieces in position over the eyes of an animal and snugly held against a distal portion of a head of the dog around the ears.

In one embodiment, first strap 30 generally comprises a first end 36a that is looped through a first slot 22a in eyepiece 12a and affixed to itself by fastener 40 to form a first loop 36. First strap 30 is mounted in an adjustment buckle 34 and doubled back on itself through a second slot 22b in eyepiece 12b to form a second loop 32. The first strap 30 terminates at end 33a that is sewn in a third loop 33 that is defined by buckle 34. In this arrangement, first strap 30 is fully adjustable to accommodate varying sizes of animal heads. Further, use of loops through slots 22a, 22b enables replacement of first strap 30 and installation of a new strap.

When eyewear 2 is fitted to a dog, resilient material 20 rests against the eye orbits of the dog and strap 30 encircles the head and ears such that buckle 34 is approximately at the rear of the head. Fastener 40 may comprise a snap fastener, a sewn joint or any other suitable affixing means.

FIG. 2 is a front elevation view of the animal eyewear of FIG. 1. The view of FIG. 2 shows lenses 17a, 17b of eyepieces 12a, 12b, respectively. In the view of FIG. 2, the lenses are illustrated in oval conformation; however, this form is purely ornamental and arbitrary and selected to provide an aesthetically attractive appearance rather than to serve any specific function, and the lenses may have any desired shape such as rectangular, rounded rectangular, circular, octagonal, etc. Each eyepiece 12a, 12b further comprises an outwardly facing goggle cup 50a, 50b having a plurality of vents 60a, 60b formed therein.

The dimensions and form of goggle cups 50a, 50b and vents 60a, 60b are purely ornamental and arbitrary and are selected to provide an aesthetically attractive appearance rather than to serve any specific function. For example, goggle cups 50a, 50b may extend outwardly any desired dimension and may have any desired dimensional relationship to lenses 17a, 17b and eyepieces 12a, 12b. Thus the goggle cups may be relatively flat whereas the eyepieces 12a, 12b are curved, may have smooth surfaces or textured surfaces, may have color variation with respect to the eyepieces, etc. For purposes of illustrating a clear example, in FIG. 2 four vents 60a, 60b formed as elongated ovals or slits are shown in each goggle cup 50a, 50b.

Vents 60a, 60b function to permit ambient atmospheric air to enter goggle cups 50a, 50b when eyewear 2 is secured in position on an animal, and thereby prevent the goggle cups from fogging up when there is a temperature or humidity difference between the airspace within the goggle cups and ambient atmosphere. However, there may be any number of vents in any arrangement and size; the arrangement and size of the vents are non-functional, ornamental and arbitrary. For example, vents may be circular and arranged in a pattern of holes, formed by a crosshatch pattern of ribs, etc.

As further shown in FIG. 2, second strap 38 is joined to buckle 42 by a loop sewn therein. Second strap also has a first end 39 that is joined by fastener 40 to first strap 30 at a position adjacent to loop 36 of the first strap, and a second end 44 that loops around the first strap in a position generally adjacent to loop 32. In this arrangement, second strap 38 is slidable rearwardly and can flex downwardly, and is fully adjustable downwardly using the buckle 42 to accommodate a wide range of dimensions in the neck and throat areas of an animal.

In both straps 30, 38, adjustment means other than buckles 34, 42 may be used.

Figure 3:
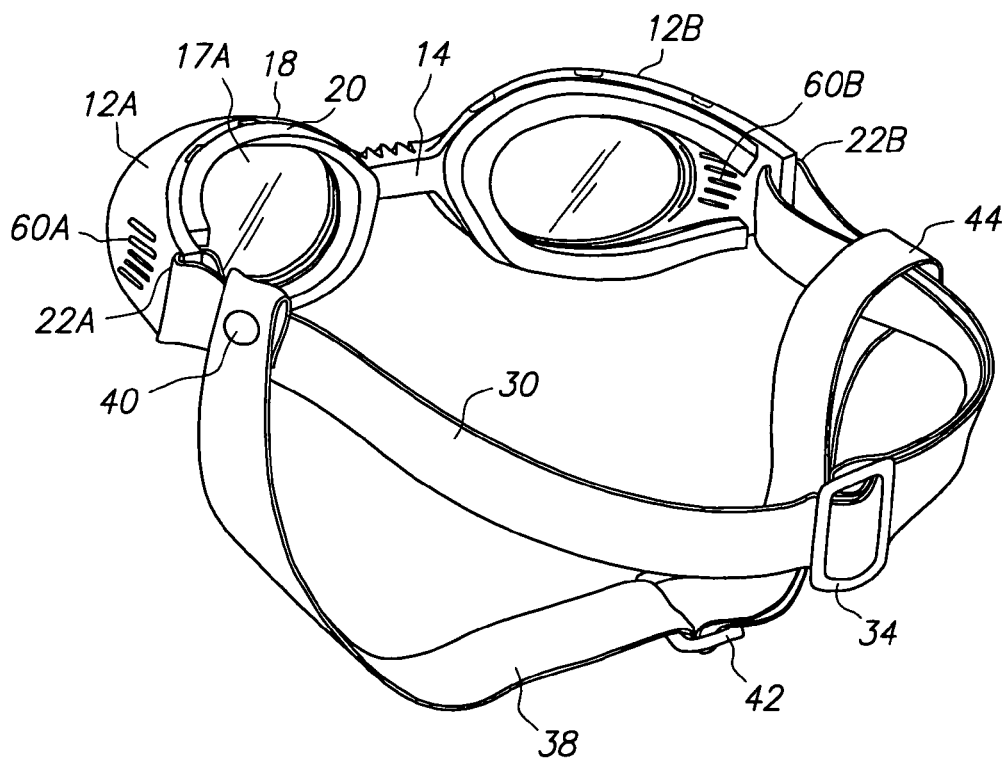
FIG. 3 is a rear perspective view of the animal eyewear of FIG. 1, FIG. 2.

FIG. 3 is a rear perspective view of the animal eyewear of FIG. 1, FIG. 2. In the view of FIG. 3, one example embodiment of resilient material 20 is shown, in which the resilient material is structured as a curved band that extends substantially entirely around the inside of each eyepiece 12a, 12b. As a result, a cushioned structure is provided such that the eyewear 2 can fit snugly against the eye orbits of animals having a variety of eye shapes and dimensions.

Figure 4:
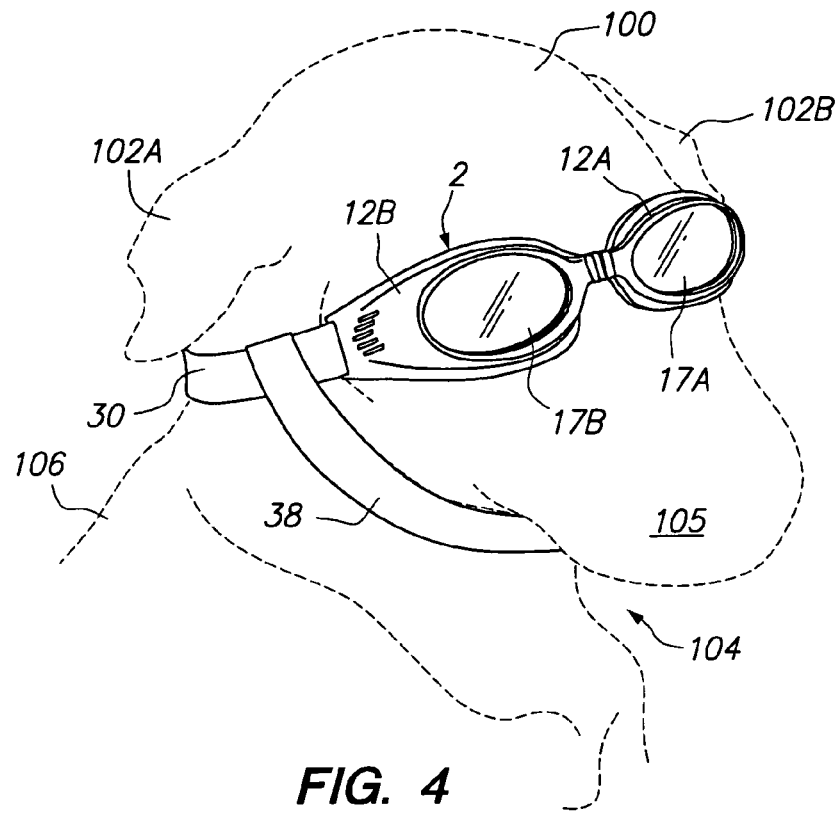
FIG. 4 is a left perspective view of the animal eyewear of FIG. 1, FIG. 2, and FIG. 3, illustrating a wearing position on a dog.
Figure 5:
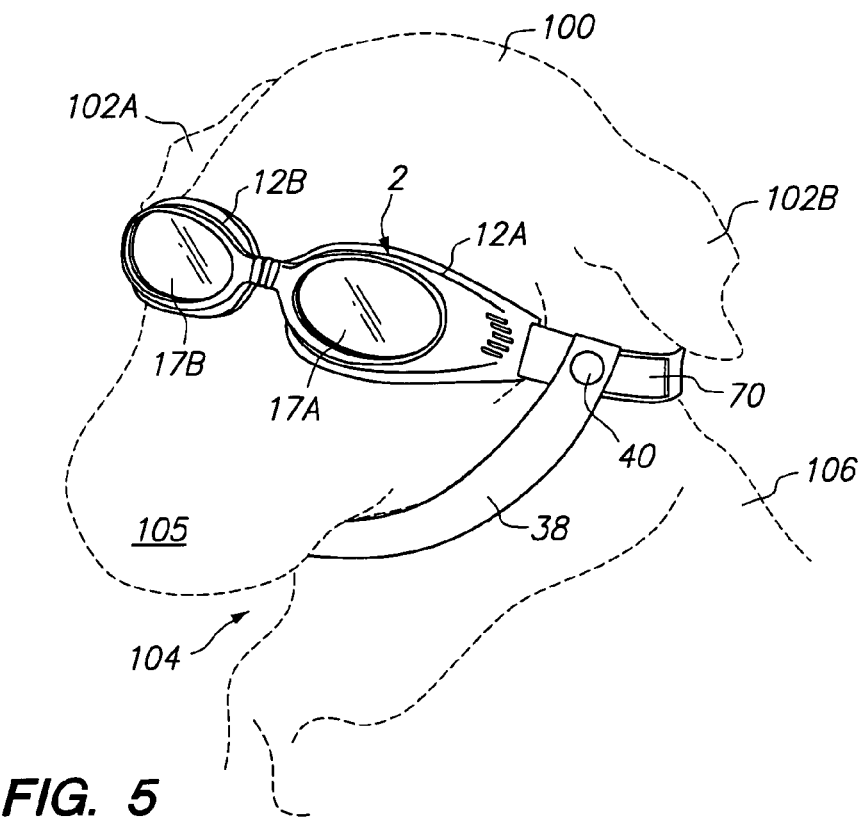
FIG. 5 is a right perspective view of the animal eyewear of FIG. 1, FIG. 2, and FIG. 3, illustrating a wearing position on a dog.

FIG. 4 is a left perspective view of the animal eyewear of FIG. 1, FIG. 2, and FIG. 3, illustrating a wearing position on a dog, and FIG. 5 is a right perspective view of the animal eyewear of FIG. 1, FIG. 2, and FIG. 3, illustrating a wearing position on a dog. The views of FIG. 4, FIG. 5 illustrate that eyewear 2 is fitted to a dog, in this example embodiment, by placing eyepieces 12a, 12b over the eyes of the animal 100, and securing the first strap 30 under the ears 102a, 102b and around the neck 106 as a head strap. The second strap 38 serves as a neck strap and is joined to the first strap 30 and configured for retaining the eyepieces snugly against an underside of a throat or neck of the animal. In the embodiment of FIG. 4, FIG. 5, the second strap 38 is secured under the nose and muzzle 105 of a dog such that the strap rests against the front of the neck 104. Fastener 40 may comprise a detachable snap to facilitate securing the straps to the head of the animal by detaching the fastener, securing first strap 30 in position, placing second strap 38 in position, and attaching the fastener.

In this arrangement, the eyewear 2 is retained snugly in position and resists movement of the animal's head. In particular, in active domestic animals such as dogs the use of first and second straps 30, 38 has been found effective to prevent the dog from shaking the eyewear 2 off or disrupting its position in the course of normal activities.

In one specific embodiment, straps 30, 38 are made of comfortable, plush elastic, and resilient material 20 that lines the inside of eyepieces 12a, 12b is foam padding. Eyepieces 12a, 12b and bridge 14 may be formed of plastic materials such as polystyrene, polyethylene, etc., such that the eyepieces and bridge form a flexible frame that will bend to wrap around an animal's head and face, regardless of the shape of the face. Further, the use of elastic material for straps 30, 38 ensures that eyepieces 12a, 12b rest snugly against the eye orbits of the animal, thereby preventing entry of light or UV radiation from the sides, which is a drawback of sunglasses.

The drawing figures provided herewith are not intended as scale drawings, and the dimensions of all parts shown herein are not critical. In particular, eyewear 2 may be formed to fit any species or breed of animal. Table 1 presents typical dimensional information for embodiments useful for dogs:

TABLE 1

DOG EYEWEAR-EXAMPLE DIMENSIONS

| Example | Typical Size Dog (pounds) | Back Strap and Frame (inches) | Chin Strap Length (inches) | Actual Lens Size (inches) | Distance Between Lenses (inches) |
|---|---|---|---|---|---|
| 1 | 7-25 | 12-20 | 4-8 | 1½ high × 2 wide | 1 |
| 2 | 15-60 | 15-25 | 5-11 | 1½ high × 2¼ wide | 1 |
| 3 | 20-75 | 18-30 | 6-15 | 1½ high × 2½ wide | 1¼ |
| 4 | 45 and up | 18-30 | 6-15 | 1½ high × 2½ wide | 1¼ |

In this example, dimensions for the back strap and frame length are determined by measuring the entire head circumference, across the eyes and around under the ears. Dimensions of the chin strap are determined by starting just under one ear and measuring under the chin, and back up to under the other ear. The distance between lenses is determined by measuring the furry spot between the eyes.

Eyepieces 12a, 12b, bridge 14, and lenses 17a, 17b may be formed in any desired colors. In one specific embodiment, lenses 17a, 17b are tinted and/or coated with a UV-block coating. In this arrangement, eyewear 2 provides protection from foreign objects, wind, and UV light. Lenses may be formed of glass, polycarbonate, styrene plastic, or other suitable materials.

II. Animal Eyewear with Optimized Dimensions

FIG. 6A to FIG. 6C, and FIG. 7, inclusive, depict animal eyewear with optimized dimensions.

Figure 6A:
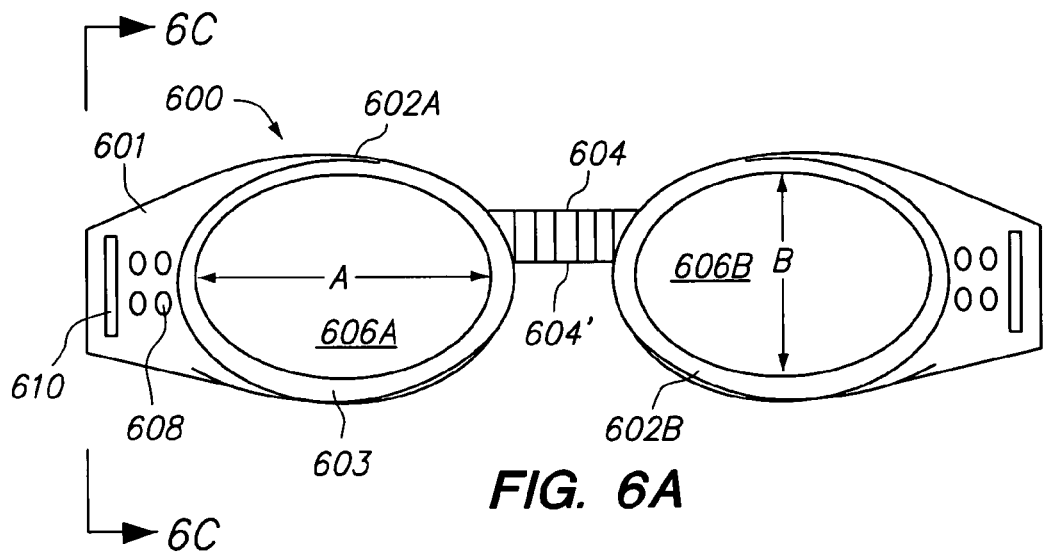
FIG. 6A is a front flattened elevation view of animal eyewear.

FIG. 6A is a front flattened elevation view of animal eyewear. A "flattened" view, in this description, is a projected view that shows features and details that are normally hidden in a conventional plan, elevation or isometric view. Eyewear 600 comprises first and second lens cups 602A, 602B that are formed integrally with an eyewear body 601. Each lens cup 602A, 602B holds one of a pair of lenses 606A, 606B, respectively. In one embodiment, each lens 606A, 606B is generally elliptical. Each lens has a width (or major axis) dimension "A" and a height (or minor axis) dimension "B."

The first and second lens cups 602A, 602B are joined by a narrow and generally flexible bridge 604, which enables the lens cups to flex across the muzzle of an animal and thereby fit snugly against the eyes.

Figure 6B:
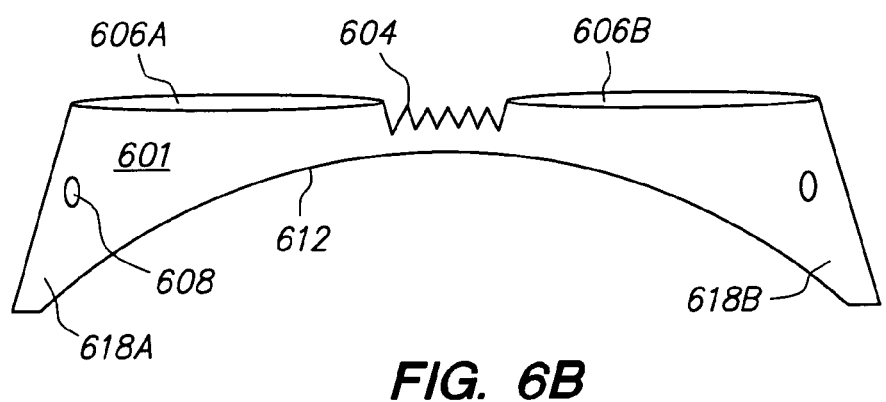
FIG. 6B is a top flattened plan view of the animal eyewear of FIG. 6A.

Eyewear body 601 further comprises first and second strap slots 610 that may receive head straps of the type described above with respect to FIG. 1-FIG. 5. Eyewear body 601 further has one or more vent holes 608 that enable moisture to escape from within a lens cup when fitted to an animal. The size, number and arrangement of vent holes 608 is purely arbitrary and non-functional FIG. 6B is a top flattened plan view of the animal eyewear of FIG. 6A. In FIG. 6B lens cups 602A, 602B may be seen to comprise respective rearwardly extending wings 618A, 618B and a generally arcuate profile as indicated by arc 612. This configuration enables the eyewear to fit snugly over the eyes of an animal and ensures that the straps holding the eyewear on the head of the animal are situated rearward of the peripheral field of view of the animal.

Figure 6C:
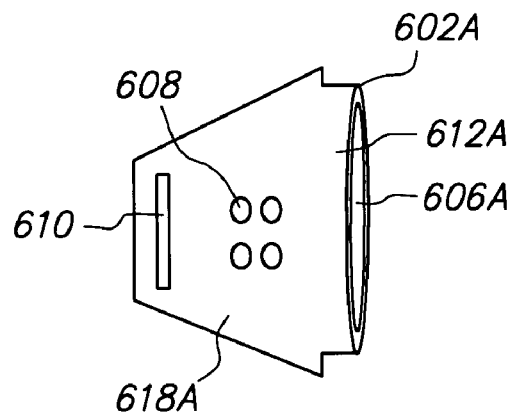
FIG. 6C is a side elevation view of the animal eyewear of FIG. 6A, FIG. 6B taken along line 6C-6C of FIG. 6A.

FIG. 6C is a side elevation view of the animal eyewear of FIG. 6A, FIG. 6B taken along line 6C-6C of FIG. 6A. In the view of FIG. 6C, lens cup 602A may be seen to comprise a peripheral generally upstanding rim 612A that surrounds lens 606A. This arrangement enables the lens cup 602A to hold a generally flat lens 606A in an upright position.

Figure 7:
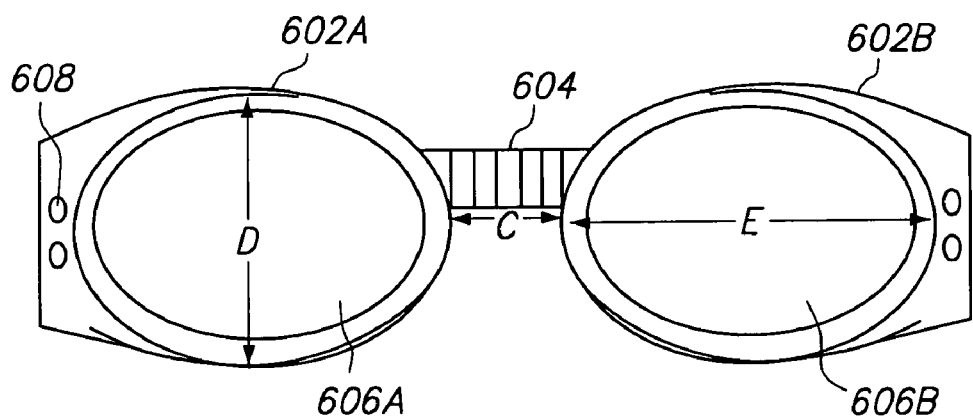
FIG. 7 is a front elevation view of the animal eyewear of FIG. 6A, FIG. 6B, FIG. 6C.

FIG. 7 is a front elevation view of the animal eyewear of FIG. 6A, FIG. 6B, FIG. 6C. In the view of FIG. 7, lens cups 602A, 602B each have minor and major dimensions "D" and "E." Further, bridge 604 has a minor dimension "C" taken along its lower edge 604' (as seen in FIG. 6A).

The inventors named herein have found that forming eyewear that fits canines of a variety of breeds may be performed by using the eyewear of FIG. 6A-FIG. 7 with dimensions A, B, C, D, and E selected in certain ratios that relate eyewear size to the size of the animal. In one embodiment, the dimensions of Table 2 and Table 3 may be used.

Table 2 relates various dimensional ratios including lens width to bridge width (A:C), lens height to lens width (B:A), lens cup width to bridge width (E:C), and lens cup height to bridge width (D:C).

TABLE 2

EYEWEAR DIMENSIONS

| EYEWEAR SIZE | LENS WIDTH ("A") | LENS HEIGHT ("B") | BRIDGE WIDTH ("C") | RATIO A:C | RATIO B:A | CUP WIDTH ("E") | CUP HEIGHT ("D") | RATIO E:C | RATIO D:C |
|---|---|---|---|---|---|---|---|---|---|
| EXTRA SMALL | 1.30 | 1.00 | 0.30 | 0.23 | 0.30 | 1.50 | 1.20 | 0.20 | 0.25 |
| SMALL | 1.80 | 1.20 | 0.40 | 0.22 | 0.33 | 2.10 | 1.50 | 0.19 | 0.27 |
| MEDIUM | 2.00 | 1.50 | 0.70 | 0.35 | 0.47 | 2.30 | 1.80 | 0.30 | 0.39 |
| LARGE | 2.20 | 1.70 | 0.90 | 0.41 | 0.53 | 2.70 | 2.00 | 0.33 | 0.45 |
| EXTRA LARGE | 2.60 | 2.00 | 1.00 | 0.38 | 0.50 | 3.10 | 2.30 | 0.32 | 0.43 |

Table 3 relates lens area to bridge width. Significantly, the inventors named herein have found that a flat lens area-to-bridge width ratio in the range of about 0.19 to about 0.24 yields animal eyewear that fits the animal head well.

TABLE 3

RELATIONSHIP OF FLAT LENS AREA TO BRIDGE SIZE

| EYEWEAR SIZE | LENS WIDTH ("A") | LENS HEIGHT ("B") | BRIDGE WIDTH ("C") | FLAT LENS AREA | FLAT LENS AREA-TO-BRIDGE-WIDTH RATIO |
|---|---|---|---|---|---|
| EXTRA SMALL | 1.30 | 1.00 | 0.30 | 1.30 | 0.23 |
| SMALL | 1.80 | 1.20 | 0.40 | 2.16 | 0.19 |
| MEDIUM | 2.00 | 1.50 | 0.70 | 3.00 | 0.23 |

TABLE 3-continued

RELATIONSHIP OF FLAT LENS AREA TO BRIDGE SIZE

| EYEWEAR SIZE | LENS WIDTH ("A") | LENS HEIGHT ("B") | BRIDGE WIDTH ("C") | FLAT LENS AREA | FLAT LENS AREA-TO-BRIDGE-WIDTH RATIO |
|---|---|---|---|---|---|
| LARGE | 2.20 | 1.70 | 0.90 | 3.74 | 0.24 |
| EXTRA LARGE | 2.60 | 2.00 | 1.00 | 5.20 | 0.19 |

The flat lens area may be determined roughly by measuring approximate eye orbit dimensions of a subject animal, and then applying the ratios defined herein to determine the size of the eyewear. The eyewear is then made using the resulting dimensions. Alternatively, a bridge measurement may be made across the muzzle of the subject animal, and the eyewear may be fabricated with lens and other dimensions that are determined by applying the ratios defined herein.

III. Animal Eyewear with Interchangeable Lenses

Figure 8A:
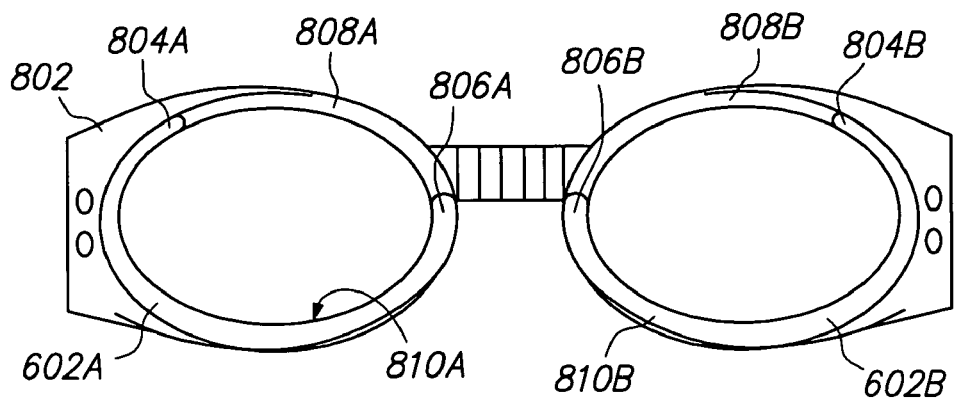
FIG. 8A is a front elevation view of animal eyewear that can accommodate interchangeable lenses.
Figure 8B:
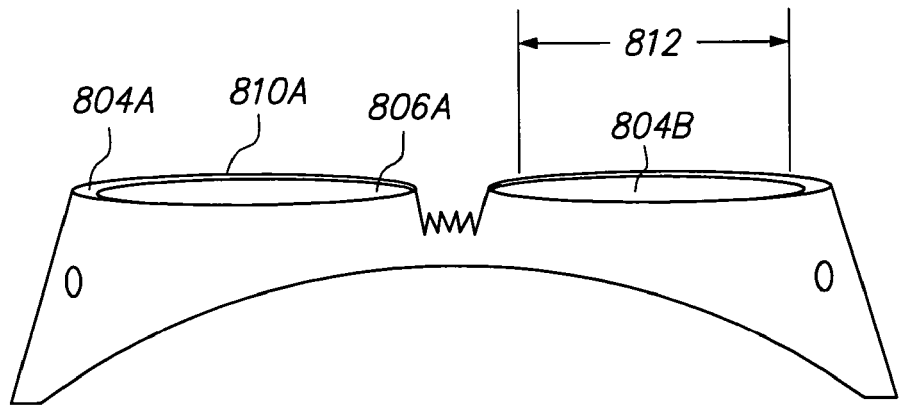
FIG. 8B is a top plan view of the animal eyewear of FIG. 8A.
Figure 8C:
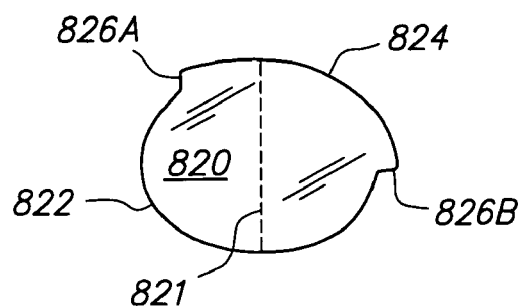
FIG. 8C is a top plan view of a lens for the animal eyewear of FIG. A.
Figure 8D:
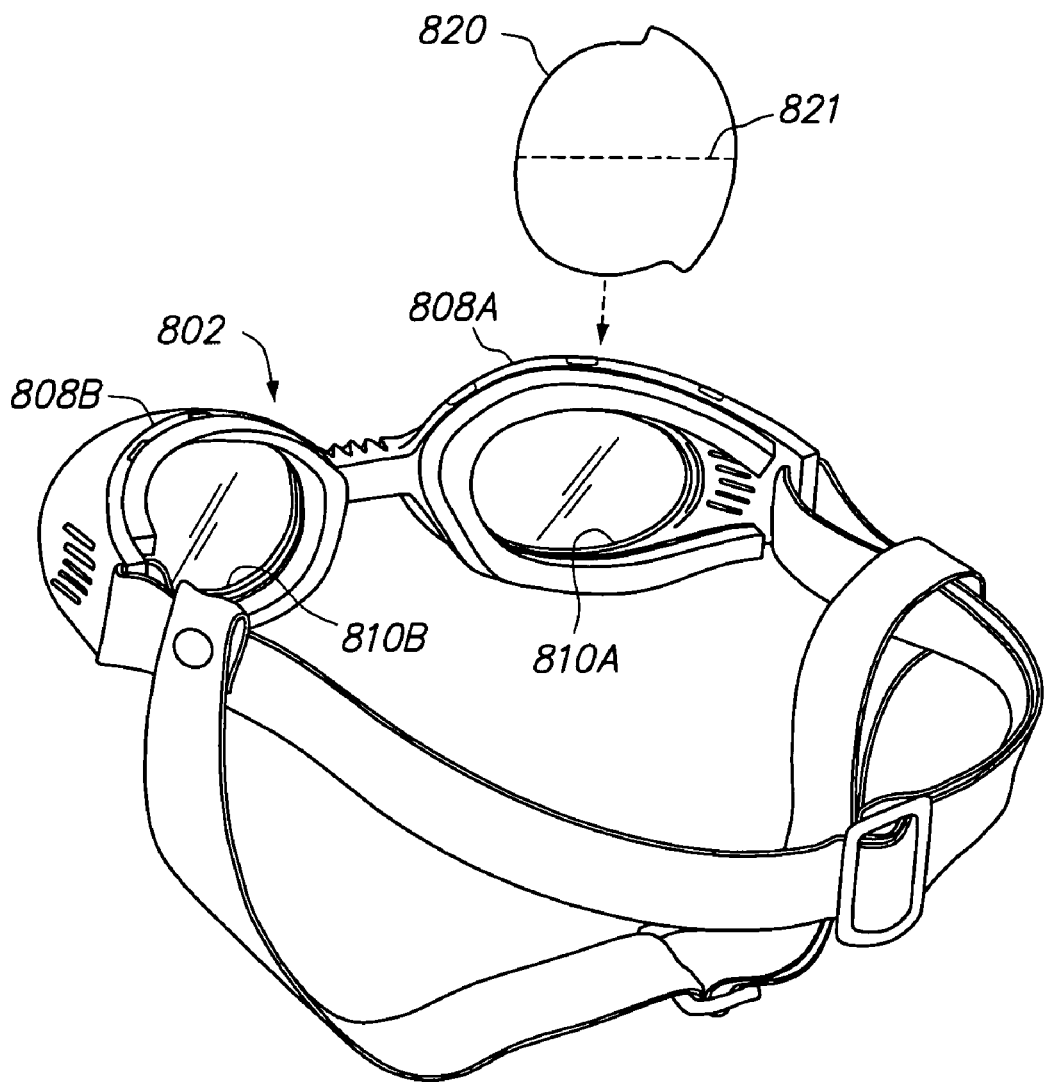
FIG. 8D is a perspective view of the animal eyewear of FIG. 8A, further illustrating a lens for interchanging.

FIG. 8A is a front elevation view of animal eyewear that can accommodate interchangeable lenses. FIG. 8B is a top plan view of the animal eyewear of FIG. 8A. FIG. 8C is a top plan view of a lens for the animal eyewear of FIG. A. FIG. 8D is a perspective view of the animal eyewear of FIG. 8A, further illustrating a lens for interchanging.

Referring first to FIG. 8A, animal eyewear 802 has a structure generally similar to the eyewear of FIG. 6A, FIG. 6B, FIG. 6C, FIG. 7; however, the eyewear of FIG. 8A further comprises structures that can accommodate insertion and removal of an interchangeable lens. Lens cup 602A comprises a first lens insertion slots 810A defined by an upper slot surface 811A. First and second spaced-apart ends 804A, 806A further define upper slot surface 811A. An underlying slot surface 808A lies between ends 804A, 806A and provides an opening that can receive an interchangeable lens 820 (FIG. 8C). Thus each lens insertion slot 810A, 810B comprises a generally elongated, narrow slot having a slot width that can receive and snugly retain an interchangeable lens 820 therein.

In one embodiment, each underlying slot surface 808A between ends 804A, 806A has an overall length 812 (FIG. 8B) that is at least slightly greater than the minor axis 821 of interchangeable lens 820. In this arrangement, the interchangeable lens 820 may be inserted into either lens cup 602A while oriented with its minor axis 821 generally parallel to slot surface 808A, as shown in FIG. 8D. The lens 820 is inserted entirely into the selected lens cup and then rotated slightly such that its minor axis 821 is perpendicular to the slot, and in a generally vertical orientation. The lens 820 then is pressed into the slot 810A such that shoulders 826A, 828A of lens 820 rest against ends 804A, 806A. Lens 820 has a thickness arranged to enable slot 810A to snugly retain the lens.

To remove an interchangeable lens 820, the foregoing procedure is reversed using sufficient upward pressure and rotation to remove the lens from the slot and lens cup. Using this procedure, any of a plurality of interchangeable lenses may be removed from or inserted into the animal eyewear 802. As a result, a user may change the lenses in the eyewear according to different conditions. For example, various interchangeable lenses may comprise clear lenses, tinted lenses, lenses with special coatings, etc.

The eyewear of FIG. 8A, FIG. 8B, FIG. 8C, FIG. 8D may be packaged and sold in a kit consisting of eyewear and a plurality of different interchangeable lenses.

IV. Extensions and Alternatives

In the foregoing specification, the invention has been described with reference to specific embodiments thereof. However, it will be evident that various modifications and changes may be made thereto without departing from the broader spirit and scope of the invention. For example, certain embodiments have been described with respect to use with dogs, however, other embodiments may be used with other animal species. The specification and drawings are, accordingly, to be regarded in an illustrative rather than a restrictive sense.

What is claimed is:

1. Animal eyewear, comprising:
   a frame comprising a pair of lenses and a bridge in the frame between the lenses;
   a first retaining means joined to the frame and configured to snugly retain the frame over eyes of an animal and snugly held against a distal portion of a head of the animal;
   a second retaining means joined to the first retaining means and configured to retain the frame snugly against an underside of a throat or neck of the animal;
   wherein the bridge and each lens in the pair of lenses have dimensions that conform to a flat-lens-to-bridge-width ratio of approximately 0.18 to 0.25.

2. Eyewear as recited in claim 1, wherein the first retaining means comprises a flexible strap having first and second loops that are looped through corresponding first and second slots in the frame.

3. Eyewear as recited in claim 2, wherein the first loop is fixed and the second loop is adjustable to accommodate animal heads of varying dimensions.

4. Eyewear as recited in claim 2, wherein the first loop is fixed using an affixing means, the second loop is adjustable to accommodate animal heads of varying dimensions, and the second retaining means is joined to the first retaining means by the affixing means.

5. Eyewear as recited in claim 4, wherein the affixing means comprises a detachable snap.

6. Eyewear as recited in claim 4, wherein the affixing means comprises a plurality of sewn stitches.

7. Eyewear as recited in claim 1, wherein the second retaining means comprises an adjustable and flexible strap.

8. Eyewear as recited in claim 1, wherein the bridge is a flexible nose bridge.

9. Eyewear as recited in claim 1, wherein the lenses are UV-resistant material.

10. Eyewear as recited in claim 1, wherein each lens in the pair of lenses comprises a removable lens having a minor axis, and wherein the frame further comprises eyepieces each having a slot in an upper surface, wherein the slot has a length slightly larger than a minor axis of the removable lens, wherein the removable lens is received and retained in the slot.

11. Eyewear as recited in claim 10, wherein the removable lens comprises shoulders that rest against first and second spaced-apart ends of the slot.

12. Eyewear as recited in claim 1, wherein the flat lens area-to-bridge width ratio is approximately 0.23, and wherein each of the lenses has an area of about 1.30 square inches.

13. Eyewear as recited in claim 1, wherein the flat lens area-to-bridge width ratio is approximately 0.19, and wherein each of the lenses has an area of about 2.16 square inches.

14. Eyewear as recited in claim 1, wherein the flat lens area-to-bridge width ratio is approximately 0.23, and wherein each of the lenses has an area of about 3 square inches.

15. Eyewear as recited in claim 1, wherein the flat lens area-to-bridge width ratio is approximately 0.24, and wherein each of the lenses has an area of about 3.74 square inches.

16. Eyewear as recited in claim 1, wherein the flat lens area-to-bridge width ratio is approximately 0.19, and wherein each of the lenses has an area of about 5.20 square inches.

17. Eyewear as recited in claim 1, further comprising a plurality of interchangeable lenses each having a different optical characteristic and each having a minor axis and a major axis, and wherein the frame further comprises a pair of eyepieces each having a slot in an upper surface, wherein the slot has a length slightly larger than a minor axis of the removable lens, wherein the eyepieces are configured to receive and retain any of the interchangeable lenses in the slot.

* * * * *